United States Patent
Meyer

(10) Patent No.: US 8,359,920 B2
(45) Date of Patent: Jan. 29, 2013

(54) GRAVITY SENSING INSTRUMENT

(75) Inventor: Thomas J. Meyer, Corfu, NY (US)

(73) Assignee: Lockheed Martin Corp., Bethesda, MD (US)

( * ) Notice: Subject to any disclaimer, the term of this patent is extended or adjusted under 35 U.S.C. 154(b) by 230 days.

(21) Appl. No.: 12/759,095

(22) Filed: Apr. 13, 2010

(65) Prior Publication Data

US 2010/0288044 A1 Nov. 18, 2010

Related U.S. Application Data

(60) Provisional application No. 61/178,665, filed on May 15, 2009.

(51) Int. Cl.
*G01V 7/00* (2006.01)
(52) U.S. Cl. .................................... 73/382 G
(58) Field of Classification Search ............... 73/382 G, 73/382 R, 383
See application file for complete search history.

(56) References Cited

U.S. PATENT DOCUMENTS

| | | | | |
|---|---|---|---|---|
| 3,683,213 A * | 8/1972 | Staudte | ......................... | 310/312 |
| 3,697,766 A * | 10/1972 | Ganter et al. | .................. | 310/348 |
| 3,727,462 A * | 4/1973 | Stone et al. | .................. | 73/382 R |
| 4,377,765 A * | 3/1983 | Kogure et al. | ................. | 310/312 |
| 4,379,244 A * | 4/1983 | Dinger | .......................... | 310/312 |
| 4,992,656 A * | 2/1991 | Clauser | .......................... | 250/251 |
| 5,339,684 A | 8/1994 | Jircitano et al. | | |
| 5,357,802 A * | 10/1994 | Hofmeyer et al. | ........... | 73/382 G |
| 5,402,340 A * | 3/1995 | White et al. | ...................... | 702/5 |
| 5,866,818 A * | 2/1999 | Sumi et al. | .................. | 73/514.33 |
| 5,922,951 A * | 7/1999 | O'Keefe et al. | .............. | 73/382 G |
| 5,962,781 A * | 10/1999 | Veryaskin | .................... | 73/382 G |
| 6,082,194 A * | 7/2000 | Gladwin | ....................... | 73/382 G |
| 6,112,594 A * | 9/2000 | Brinks et al. | .................... | 73/493 |
| 6,125,698 A * | 10/2000 | Schweitzer et al. | ........ | 73/382 G |
| 6,236,140 B1 * | 5/2001 | Arimura | ......................... | 310/312 |
| 6,249,074 B1 * | 6/2001 | Zimnicki et al. | ............... | 310/312 |
| 6,262,520 B1 * | 7/2001 | Knowles | ........................ | 310/370 |
| 6,414,569 B1 * | 7/2002 | Nakafuku | ....................... | 333/188 |
| 6,701,785 B2 * | 3/2004 | Knowles et al. | ............ | 73/504.16 |
| 7,096,733 B2 * | 8/2006 | Ohta et al. | ................... | 73/504.16 |
| 7,181,967 B2 * | 2/2007 | Lee | ............... | 73/382 G |
| 7,207,221 B2 * | 4/2007 | Kawauchi et al. | .......... | 73/504.12 |
| 7,444,867 B2 * | 11/2008 | Brett et al. | ................... | 73/382 R |
| 7,456,554 B2 * | 11/2008 | Ishikawa et al. | .............. | 310/367 |
| 7,497,117 B2 * | 3/2009 | Ohta | ............................... | 73/493 |

(Continued)

OTHER PUBLICATIONS

Int'l Search Report (ISR) and Written Opinion (WO) mailed Jun. 14, 2010 in PCT/US2010/001417.

*Primary Examiner* — Peter Macchiarolo
*Assistant Examiner* — Samir M Shah
(74) *Attorney, Agent, or Firm* — Wallace G. Walter

(57) ABSTRACT

An instrument for determining the second and/or third-order components of the gravity tensor includes a group of six accelerometers arranged at an equal radius from a spin axis and positioned at 60 degree intervals about the spin axis with the sensing axis of each accelerometer aligned tangentially to the circle subscribed by the accelerometers as they rotate about the spin axis. A gyro-stabilized platform maintains the accelerometer arrangement at a preferred alignment relative to the local gravity vector. As the accelerometers orbit about the spin axis, each accelerometer outputs a sinusoidal signal that is offset by 60 degrees from its immediately adjacent leading and trailing accelerometers with the outputs thereof processed to provide the second-order component and the third-order tensor component. In another arrangement, a group of eight accelerometers arranged at an equal radius from a spin axis and positioned at 45 degree intervals about the spin axis can provide second, third, and fourth-order tensor components. The higher-order tensor components are of use in "de-cluttering" the lower-order tensor components.

7 Claims, 10 Drawing Sheets

U.S. PATENT DOCUMENTS

| | | | |
|---|---|---|---|
| 7,788,975 B2 * | 9/2010 | Brett et al. | 73/382 R |
| 7,788,978 B2 * | 9/2010 | Ishikawa et al. | 73/504.12 |
| 7,886,596 B2 * | 2/2011 | Matsunaga et al. | 73/504.02 |
| 7,938,003 B2 * | 5/2011 | Van Kann et al. | 73/382 G |
| 7,942,054 B2 * | 5/2011 | Van Kann et al. | 73/382 G |
| 7,975,544 B2 * | 7/2011 | Van Kann et al. | 73/382 G |
| 7,980,130 B2 * | 7/2011 | Kann et al. | 73/382 G |
| 8,033,170 B2 * | 10/2011 | Van Kann | 73/382 G |
| 8,074,366 B2 * | 12/2011 | Jiang | 33/391 |
| 8,074,515 B2 * | 12/2011 | Van Kann et al. | 73/382 G |
| 8,079,258 B1 * | 12/2011 | Sapuppo | 73/504.02 |
| 2002/0021059 A1 * | 2/2002 | Knowles et al. | 310/370 |
| 2003/0209070 A1 * | 11/2003 | Dosch et al. | 73/382 G |
| 2008/0034865 A1 * | 2/2008 | Matsunaga et al. | 73/510 |
| 2009/0064778 A1 * | 3/2009 | Metzger et al. | 73/382 G |

* cited by examiner

US 8,359,920 B2

GRAVITY SENSING INSTRUMENT

CROSS REFERENCE TO RELATED APPLICATION

This application claims the benefit of U.S. Provisional Patent Application No. 61/178,665 filed by the inventor herein on May 15, 2009 and in common assignment herewith.

BACKGROUND

The present invention relates to an improved gravity gradiometer instrument (GGI) and, more particularly, to gravity gradiometer instruments that are responsive to one or more higher-order gravity-gradient characteristics.

Various instruments have been developed to measure gravity gradients, these instruments include gradiometers that are designed to measure the differential curvature or ellipticity of gravity equipotential surfaces, the rate of change of the increase of gravity in the horizontal direction, and/or the rate of increase of gravity in the vertical direction.

Gradiometers have been used as navigational aids in subsurface sea-going vessels, gravity field surveys in which one or more gradiometers are carried in a vehicle (i.e., aircraft, surface or sub-surface sea-going vessel, land vehicle, etc.) and, more specifically, as an aid in identifying the boundaries of sub-surface liquid hydrocarbon deposits.

A representative or example gradiometer is shown in FIG. 5 and is sold by the Lockheed Martin Corporation (Niagara Falls N.Y. USA) and is described in more detail in U.S. Pat. No. 5,357,802 issued Oct. 25, 1994 to Hofineyer and Affleck and entitled "Rotating Accelerometer Gradiometer," the disclosure of which is incorporated herein by reference.

As shown in FIG. 5, the exemplary gravity gradiometer instrument GGI includes eight accelerometers 100 mounted at a common radius and equi-spaced about the periphery of a rotor assembly 102 that is rotated at a constant and controlled angular velocity about a spin axis $SA_x$. The rotor assembly 102 includes the rotor 104 carried on a support shaft 106 for rotation therewith. The rotor assembly 102 is rotatably mounted in ball bearings 108 and, in turn, carried in a flex-mount assembly 110 and carried in a gyro-stabilized gimbal mount. Processing electronics 112 are mounted on the rotor 104 adjacent each accelerometer 100 for processing the respective accelerometer output signal. An inner housing 114 contains the rotor assembly 102 and is designed to rotate with the rotor assembly 102. An outer housing 116 contains the interior components and includes one or more heaters 118 designed to operate the instrument at some controlled temperature above ambient and also includes a magnetic-field shield 120. A slip-ring assembly 122 at the upper end of the mounting shaft 106 provides the electrical/signal interface with the rotor assembly 102 and the active devices thereon. A shaft encoder 124 at the lower end of the mounting shaft 106 cooperates with an encoder pick-off 126 to provide rotary position information. The output of the encoder pick-off 126 is provided to a soft/firmware-controlled computer or microcomputer and speed controller, which, in turn, controls a drive motor 128 at the upper end of the unit to provide a controlled rotary velocity.

The gradiometer includes an internal linear servo controlled actuator that imparts a 2 Hz sinusoidal acceleration to each accelerometer pair to enable biasing and compensation of various errors including the $g^2$ rectification error. In addition, the gravity gradiometer GGI is mounted on an external vibration isolation system that assists in attenuating higher frequency vibration.

Each accelerometer 100 is of the force-rebalance type and provides a substantially sinusoidally varying analog output that is a function of the acceleration experienced by each accelerometer as the accelerometer orbits the spin axis SA. For a gradiometer having its spin axis SA aligned along the field lines in an ideally uniform and unperturbed gravity field, each accelerometer experiences the same acceleration forces as its proceeds along its orbital path. However, when the local gravity field is perturbed by the presence of one or more masses and/or the spin axis SA is tilted relative to the local vertical field lines, each accelerometer will experience different accelerations throughout its respective orbit about the spin axis SA.

Gradiometers have typically been positioned with their spin axis vertical (VSA—Vertical Spin Axis), their spin axis horizontal (HSA—Horizontal Spin Axis), and in a three-GGI cluster at an 'umbrella' angle in which the spin axis is tilted 35 degrees from the local vertical, though any orientation is possible. The quantitative output of each rotating accelerometer pair, when summed and differenced, can be used to provide information related to the local gravity gradient field.

Gradiometers measure the second-order variation of gravitational potential and currently do not directly measure or otherwise determine third, fourth, or higher-order effects. Knowledge of the second-order effects can be used, for example, in verifying the veracity of the primary gradient measurement in submarine navigation systems, especially in those cases were the submarine is navigating along an iso-gradient line (wherein the second-order data would be zero, i.e., the partial derivative of the first-order gradient in the direction of movement would be zero). Additionally, knowledge of the second-order characteristics can be useful for edge detection of buried objects or bodies and fluid boundary detection, e.g., in resource exploration. Third-order gravity tensor components provide a natural filtering or upward continuation that may be useful for profiling objects close in proximity to the measuring gradiometer device. This is advantageous because background objects now only influence output data as inverse distance to the fourth power. Likewise, fourth-order gravity components filter even more background "clutter" by signal naturally rolling off proportional to inverse distance to the fifth power.

SUMMARY

A gradiometer instrument for determining the second and/or third-order components of the gravity tensor includes, in a preferred embodiment, a group of six accelerometers $A_1, A_2, A_3, A_4, A_5,$ and $A_6$ arranged at an equal radius from a spin axis and positioned at an equiangular spacing about the spin axis with the sensing axis of each accelerometer aligned tangentially to the circle subscribed by the accelerometers as they rotate about the spin axis. A gyro-stabilized gimbal-type platform maintains the accelerometer arrangement at a preferred alignment relative to the local gravity vector. In a steady field and without moving the instrument and as the accelerometers orbit the spin axis, an accelerometer lagging another by an angular offset will produce the identical signal but with a phase shift equivalent to that offset. A non-steady field and/or a moving gradiometer instrument shows this effect, but the equality is not strictly upheld. As the accelerometers orbit about the spin axis, each accelerometer outputs a generally sinusoidal signal that is offset by 60 degrees from its immediately adjacent leading and trailing accelerometers with the outputs thereof processed to provide the second-order component in accordance with $$(A_1 + A_5) - \frac{1}{2}(A_2 + A_3 + A_4 + A_6) =$$
$$3R\left(\frac{1}{2}(W_{xx} - W_{yy})\sin 2\Omega t - W_{xy}\cos 2\Omega t\right)$$

and the third-order component in accordance with $$(A_1 + A_2 + A_3) - (A_4 + A_5 + A_6) =$$
$$\frac{3}{4}R^2 \left[ \begin{array}{c} ((W_{xx} - W_{yy})_x - 2(W_{xy})_y)\cos 3\Omega t + \\ ((W_{xx} - W_{yy})_y + 2(W_{xy})_x)\sin 3\Omega t \end{array} \right]$$

For a gradiometer instrument having eight equi-angular spaced accelerometers $A_1$, $A_2$, $A_3$, $A_4$, $A_5$, $A_6$, $A_7$ and $A_8$, simultaneous isolation and extraction of second, third, and fourth-order gravity tensor components is possible. The second-order components extracted at twice the spin rate are obtained by summing accelerometer outputs pursuant to $$\frac{1}{2}(A_1 + A_3 + A_5 + A_7) - \frac{1}{2}(A_2 + A_4 + A_6 + A_8) =$$
$$4R\left[\frac{1}{2}(W_{xx} - W_{yy})\sin 2\Omega t - W_{xy}\cos 2\Omega t\right]$$

Simultaneously, the third-order gravity tensor components are extracted at three times the disk spin rate by summing accelerometer outputs pursuant to $$(A_1 - A_3) + \frac{1}{\sqrt{2}}(A_6 + A_7 - A_5 - A_8) =$$
$$\frac{1}{2}R^2 \left[ \begin{array}{c} ((W_{xx} - W_{yy})_x - 2(W_{xy})_y)\cos 3\Omega t + \\ ((W_{xx} - W_{yy})_y + 2(W_{xy})_x)\sin 3\Omega t \end{array} \right]$$

Additionally and simultaneously, the fourth-order gravity tensor components are extracted at four times the spin rate by summing accelerometer outputs pursuant to $$(A_1 + A_2 + A_3 + A_4) - (A_5 + A_6 + A_7 + A_8) =$$
$$\frac{1}{3}R^3 \left[ \begin{array}{c} ((W_{xx} - W_{yy})_{yy} - (W_{xx} - W_{yy})_{xx})\sin 4\Omega t + \\ 2(W_{xx} - W_{yy})_{xy}\cos 4\Omega t \end{array} \right]$$

More generally, given 2N equi-angular spaced accelerometers, the $N^{th}$ order tensor components in the plane of the accelerometers can be isolated (at integer multiples of the spin rate) and extracted. The tensor components available are not exhaustive of all the possible components that can be defined in that plane.

For exploration applications, e.g., searching for hydrocarbons or minerals, generally the second-order tensor components are most useful due to the physical size or baseline of the object sought and its correspondingly long-wavelength signal induced and measured in the gravity data. In these applications, any higher-order tensor effects induced by near-field bodies is detrimental to the sought signal and must be removed by Post Mission Compensation (PMC) techniques. To date, these PMC techniques have relied exclusively on forward modeling signal effects induced by relative motion of a GGI in its hosting stable platform (i.e., gimbal arrangement) and vehicle; this can be a costly and time consuming calibration procedure.

Direct measurement of higher-order tensor components as disclosed herein can alleviate this costly and time consuming calibration procedure. In this approach, where the sought information resides in the low-order tensor data, the higher-order tensor "noise" or "clutter" is directly removed, i.e., subtracted, from the desired low-order tensor signal.

DESCRIPTION OF THE PREFERRED EMBODIMENTS

Figure 1:
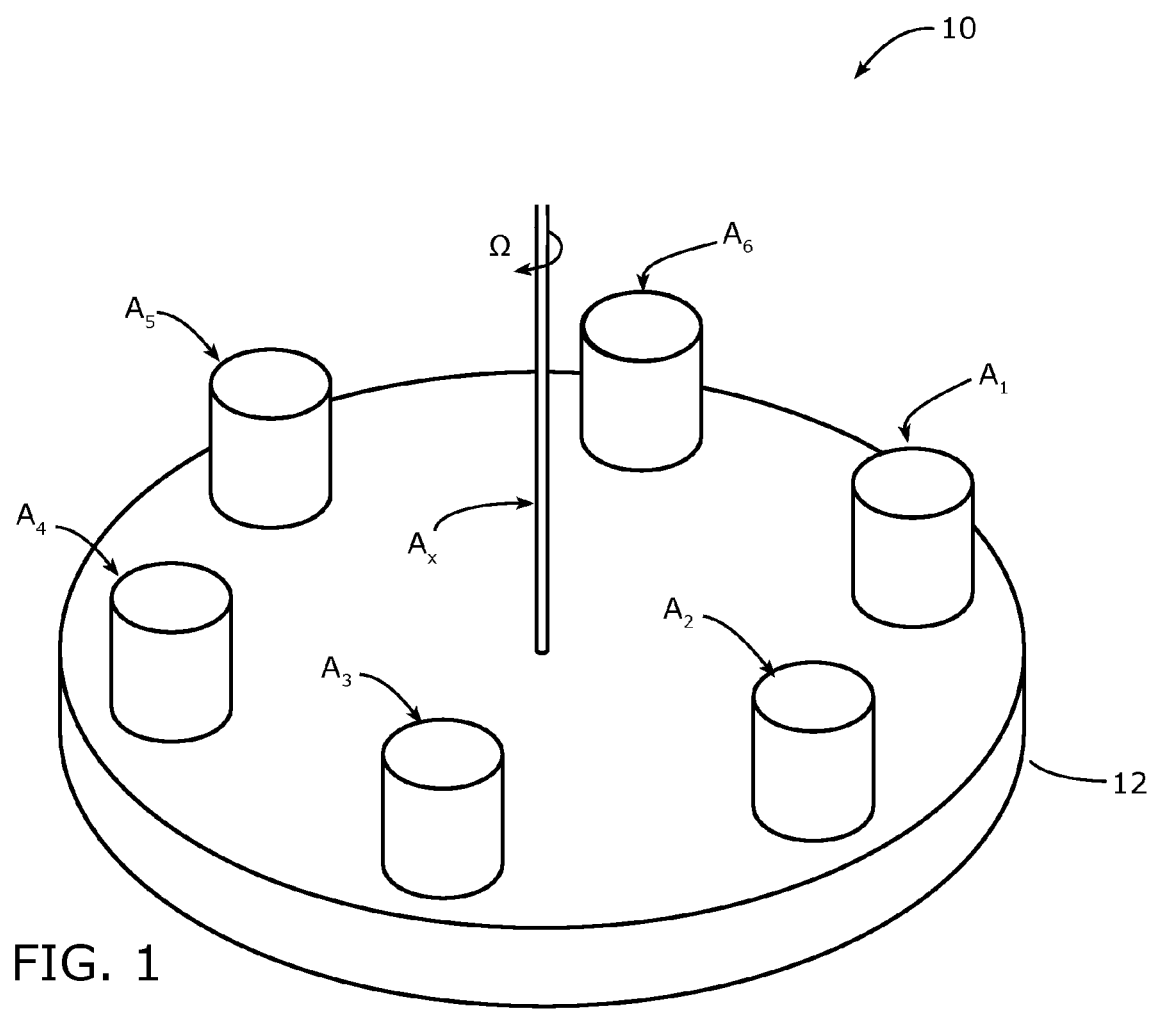
FIG. 1 is a perspective view of a six accelerometer mounting for obtaining second and third-order and higher-order tensor data, for example, in or as part of a gravity gradiometer instrument of the type shown in FIG. 5.
Figure 5:
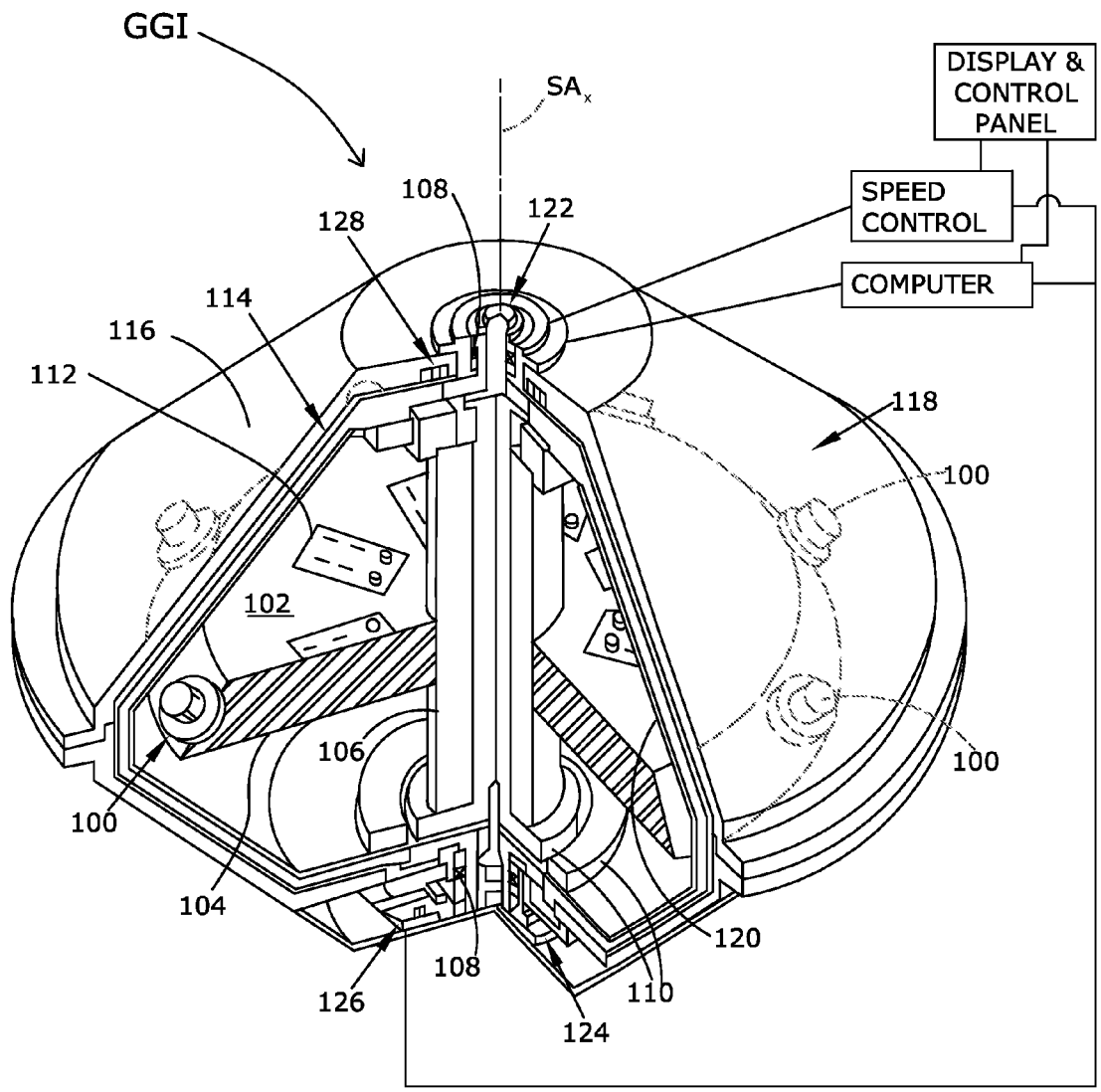
FIG. 5 is an isometric view of an exemplary prior art gravity gradiometer suitable for incorporation therein of the above-described structure with selected portions thereof broken away for reasons of clarity.

An accelerometer arrangement in accordance with the preferred arrangement is shown in schematic form in FIG. 1 and is designated therein by the reference character 10. As shown, the accelerometer arrangement 10 include six accelerometers $A_1$, $A_2$, $A_3$, $A_4$, $A_5$, and $A_6$ spaced at a common radius from an axis of rotation $A_z$ and positioned at 60 degree intervals on a disc-like or discoidal mounting structure 12. As can be appreciated, each accelerometer orbits the axis of rotation as the discoidal mounting structure rotates about the axis $A_z$. The exterior configuration of the accelerometers shown in FIG. 1 and their mounting structure 12 are exemplary. Each accelerometer $A_n$ may take the form of force re-balance accelerometers of the type shown in FIG. 5 and described in the above incorporated patent and manufactured by the Lockheed Martin Corp. under the part number Model VII-g designation. In general, any accelerometer configuration with performance characteristics (e.g., stability, accuracy, resolution, scale factor balance) sufficient relative to sought gradient extraction accuracy may be so arranged. Since accelerometers of type described include "capture" loops that maintain the pendulum-supported proof mass at a selected position, the electronics associated with the capture loop or loops can be integrated into the accelerometer or can be external to the accelerometer. The representation of FIG. 1 can be incorporated within the stabilized gimbal system of the instrument shown in FIG. 5.

Figure 2:
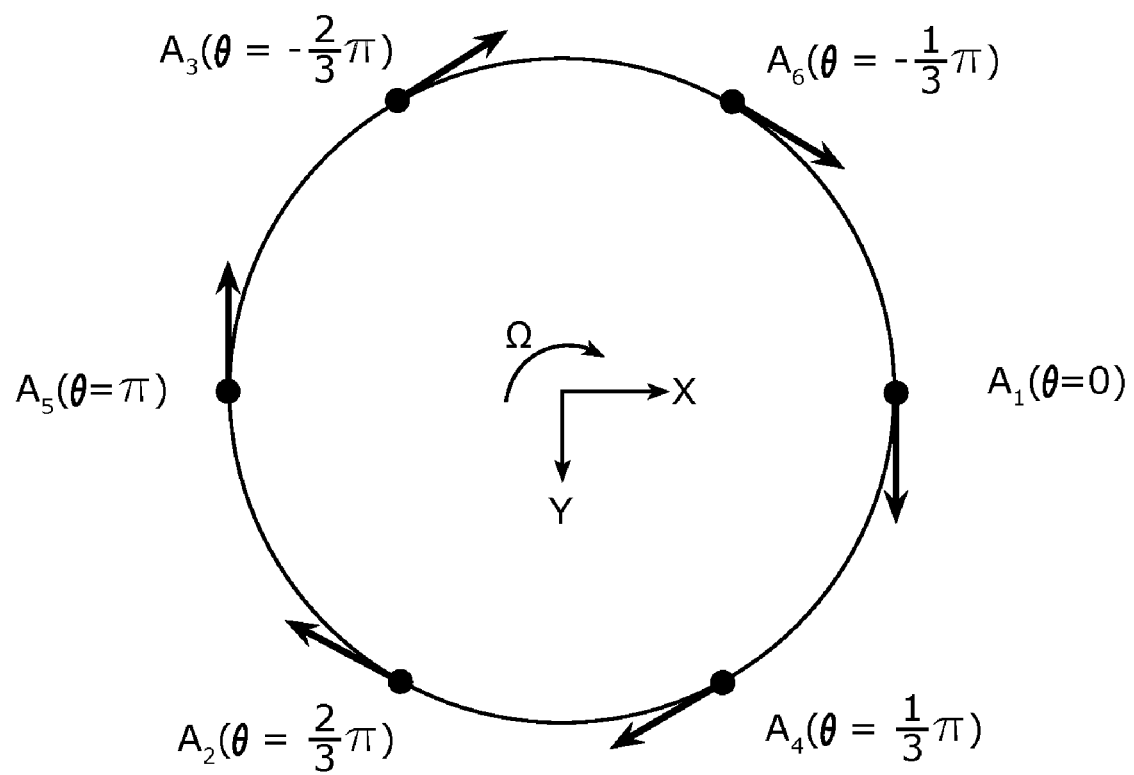
FIG. 2 is a vector diagram of the six accelerometer arrangement shown in FIG. 1 with the equations associated with each accelerometer indicative of the respective output thereof.

FIG. 2 is an idealized acceleration vector diagram of the representative physical arrangement of FIG. 1 in which the sensitive axis of each accelerometer is shown as an arrow that is aligned tangentially to the common radius R circle with the $X_G$ direction and the $Y_G$ direction within the gravity field shown with the accelerometers $A_n$ rotating about the axis $A_z$ at some steady spin rate $\Omega$. If the disk is stationary, each accelerometer provides a harmonically varying analog output that is a function of the acceleration experienced by each accelerometer as the accelerometer orbits the spin axis $A_z$. Since the various accelerometers are angularly offset from one another by 60 degrees, the respective harmonic outputs will likewise be displaced 60 degree in phase, e.g., the output of the accelerometer $A_1$ will lead that of accelerometer $A_6$ by 60 degrees while trailing that of accelerometer $A_4$ by 60 degrees.

Gradients are derived from the scalar gravitational potential field of the earth defined at a point (x,y,z) above ground in an earth-fixed reference frame as $$U(x, y, z) = -G \int_\xi \int_\eta \int_\zeta \frac{\rho(\xi, \eta, \zeta)}{\sqrt{(x-\xi)^2 + (y-\eta)^2 + (z-\zeta)^2}} d\xi d\eta d\zeta$$

where G is the universal gravitational constant (6.6720E-11 m³/(kg·s²), and p is density of an infinitesimal particle (of the earth) located at coordinates (ξ,η,ζ). The triple integral is computed over all of the earth's mass and location.

The vector of gravitational force, or merely the gravity vector, comprises the three first-order spatial derivatives of the scalar potential in each of respective x-, y-, and z-directions. These three components comprise a vector field that describes how the scalar potential varies spatially, and are written $$g_x(x, y, z) = \frac{\partial}{\partial x} U(x, y, z)$$

$$g_y(x, y, z) = \frac{\partial}{\partial y} U(x, y, z)$$

$$g_z(x, y, z) = \frac{\partial}{\partial z} U(x, y, z)$$

The second-order derivatives of the scalar potential are referred to as the second-order tensor components of gravity and comprise a tensor field. The components are identical to the first derivative of the gravity vector above, and thus describe how the gravity vector components vary spatially, i.e., describes how each of the three gravity vector components varies in each of the three coordinate directions. The total number of second-order tensor components is nine, but by virtue of the conservative nature of the scalar potential field only five of these are independent and the order of differentiation is not relevant. The second-order tensor components are written $$W_{xx}(x, y, z) = \frac{\partial}{\partial x} g_x(x, y, z)$$

$$W_{xy}(x, y, z) = \frac{\partial}{\partial y} g_x(x, y, z)$$

$$W_{xz}(x, y, z) = \frac{\partial}{\partial z} g_x(x, y, z)$$

$$W_{yx}(x, y, z) = W_{xy}(x, y, z)$$

$$W_{yy}(x, y, z) = \frac{\partial}{\partial y} g_y(x, y, z)$$

$$W_{yz}(x, y, z) = \frac{\partial}{\partial z} g_y(x, y, z)$$

$$W_{zx}(x, y, z) = W_{xz}(x, y, z)$$

$$W_{zy}(x, y, z) = W_{yz}(x, y, z)$$

$$W_{zz}(x, y, z) = \frac{\partial}{\partial z} g_z(x, y, z) = -(W_{xx}(x, y, z) + W_{yy}(x, y, z))$$

The last equation reflects the fact that everywhere the trace of the second-order tensor is zero (i.e., which satisfies the Laplacian constraint)

$$W_{xx}(x,y,z) + W_{yy}(x,y,z) + W_{zz}(x,y,z) = 0$$

Higher-order partial derivatives of the scalar potential are likewise equivalent to respective derivatives of the second-order tensor components. For example, third-order gravity tensor components are equivalent to first-order partials of second-order components, and, likewise, fourth-order gravity tensor components are equivalent to second-order derivatives of second-order components and first-order derivatives of third-order components.

The convention used here for defining higher-order tensor components is the latter approach described above, namely, first-order spatial differentiations of next-highest order tensor components, i.e., recursively. Thus, third-order tensor components are written $$(W_{xx} - W_{yy})_x = \frac{\partial}{\partial x} W_{xx}(x, y, z) - \frac{\partial}{\partial x} W_{yy}(x, y, z)$$

$$(W_{xy})_x = \frac{\partial}{\partial x} W_{xy}(x, y, z)$$

$$(W_{xx} - W_{yy})_y = \frac{\partial}{\partial y} W_{xx}(x, y, z) - \frac{\partial}{\partial y} W_{yy}(x, y, z)$$

and fourth-order components are written $$(W_{xx} - W_{yy})_{xx} = \frac{\partial}{\partial x} (W_{xx} - W_{yy})_x$$

$$(W_{xx} - W_{yy})_{xy} = \frac{\partial}{\partial y} (W_{xx} - W_{yy})_x$$

$$(W_{xx} - W_{yy})_{yy} = \frac{\partial}{\partial y} (W_{xx} - W_{yy})_y$$

where only the relevant components in the plane of the gradiometer disk are shown.

In a manner consistent with the explanation in the preceding description, the second-order tensor components (in the XY plane) can be obtained as follows:

$$(A_1 + A_5) - \frac{1}{2}(A_2 + A_3 + A_4 + A_6) =$$
$$3R\left(\frac{1}{2}(W_{xx} - W_{yy})\sin 2\Omega t - W_{xy}\cos 2\Omega t\right)$$

Additionally and also in a manner consistent with the explanation in the preceding description, the third-order tensor components (in the XY plane) can be obtained as follows:

$$(A_1 + A_2 + A_3) - (A_4 + A_5 + A_6) = \frac{3}{4}R^2\left[(W_{xx} - W_{yy})_x - 2(W_{xy})_y\right]\cos 3\Omega t + \left[((W_{xx} - W_{yy})_y + 2(W_{xy})_x\right]\sin 3\Omega t\right]$$

Figure 2A:
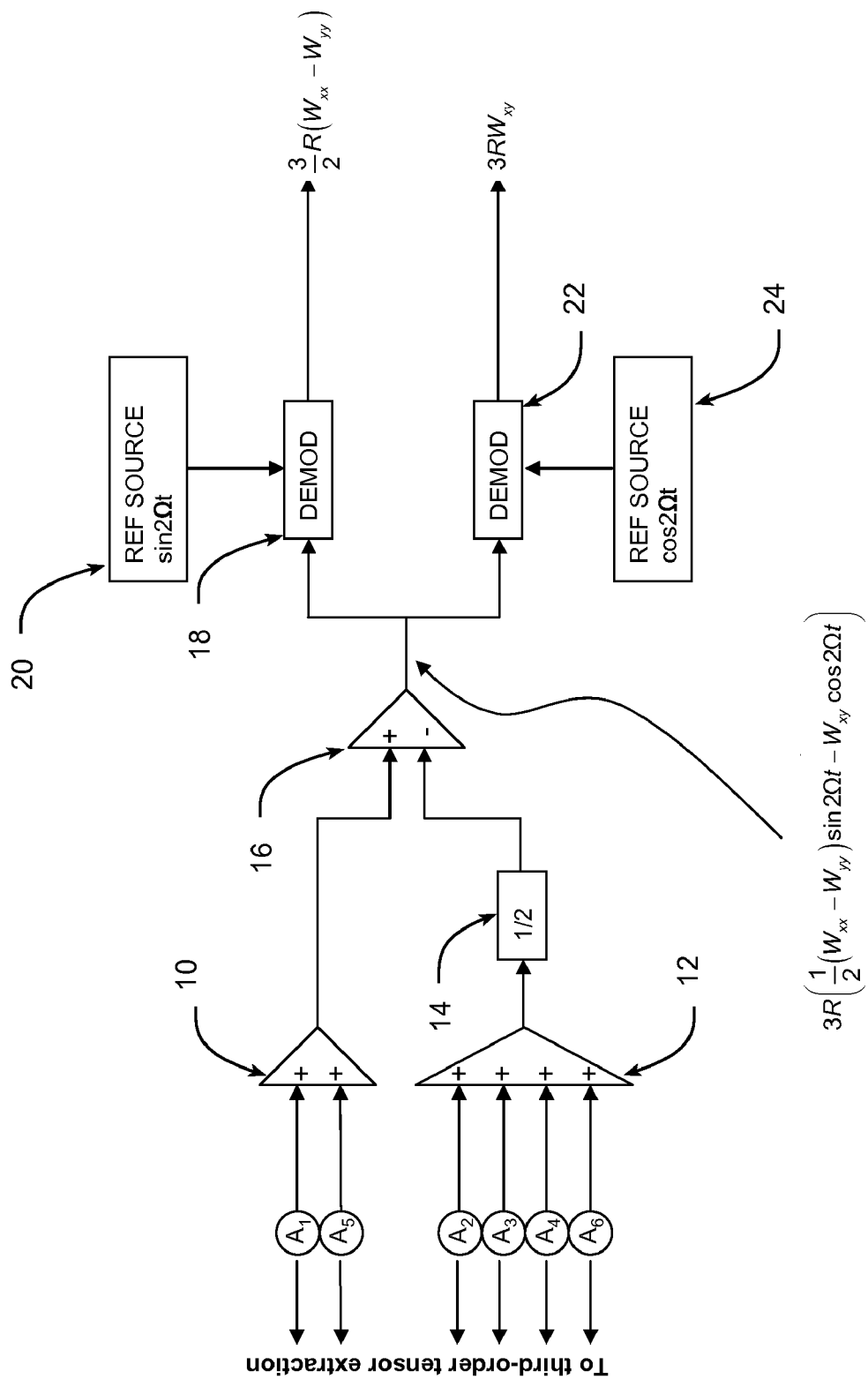
FIG. 2A is a functional block diagram showing the functional processing for isolating and extracting second-order gravity tensor components at 2Ω with a six-accelerometer gradiometer instrument.
Figure 2B:
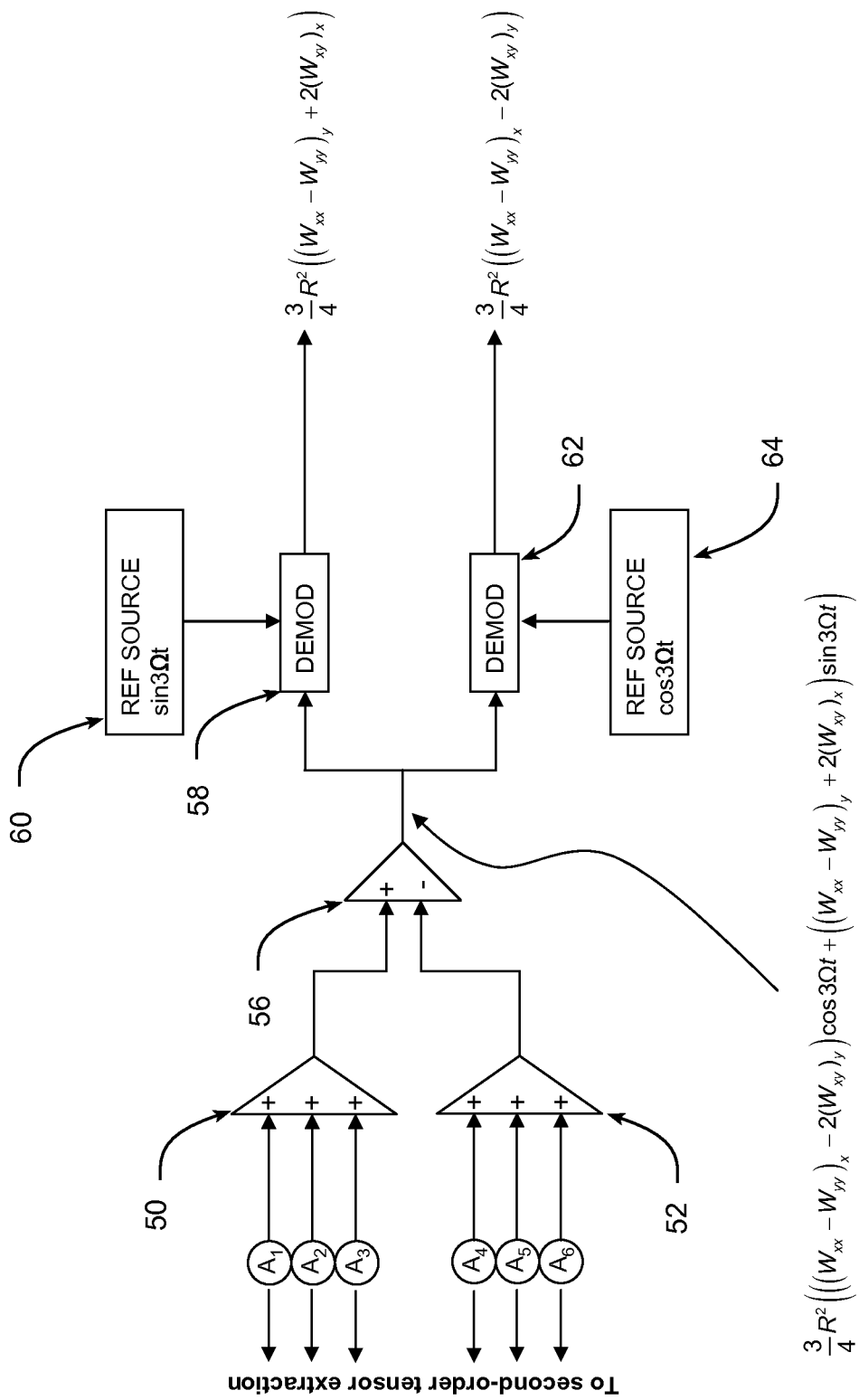
FIG. 2B is a functional block diagram showing the functional processing for isolating and extracting third-order gravity tensor components at 3Ω with a six-accelerometer gradiometer instrument.

FIGS. 2A and 2B illustrate, respectively, exemplary functional block diagrams presenting data-channel processing for simultaneously isolating and obtaining gravity second- and third-order tensor components in the sensing plane of a 6-accelerometer gradiometer.

In FIG. 2A, the signals from accelerometers $A_1$ and $A_5$ are provided to a summation block 10 and, concurrently, the signals from accelerometers $A_2$, $A_3$, $A_4$, and $A_6$ are provided to a summation block 12 with the output thereof subsequently divided by two at functional block 14. The outputs of summation block 10 and divider 12 are differenced at 16 with the output provided to a first demodulator 18 that receives its reference signal sin 2 $\Omega$t from reference signal source 20 and a second demodulator 22 that receives its reference signal cos 2 $\Omega$t from another reference signal source 24 to provide the second-order gravity tensor components outputs shown.

In FIG. 2B, the signals from accelerometers $A_1$, $A_2$, and $A_3$ are provided to a summation block 50 and, concurrently, the signals from accelerometers $A_4$, $A_5$, and $A_6$ are to a summation block 52. The outputs of summation blocks 50 and 52 differenced at 56 with the output provided to a first demodulator 58 that receives its reference signal sin 3 $\Omega$t from reference signal source 60 and a second demodulator 62 that receives its reference signal cos 3 $\Omega$t from another reference signal source 64 to provide the third-order gravity tensor components outputs shown.

In a similar manner and for a gradiometer having eight equi-angular spaced accelerometers, simultaneous isolation and extraction of second, third, and fourth-order gravity tensor components is possible. The second-order components extracted at twice disk spin rate are obtained by summing accelerometer outputs per $$\frac{1}{2}(A_1 + A_3 + A_5 + A_7) - \frac{1}{2}(A_2 + A_4 + A_6 + A_8) =$$
$$4R\left[\frac{1}{2}(W_{xx} - W_{yy})\sin 2\Omega t - W_{xy}\cos 2\Omega t\right]$$

Simultaneously, the third-order gravity tensor components are extracted at three times the disk spin rate by summing accelerometer outputs per $$(A_1 - A_3) + \frac{1}{\sqrt{2}}(A_6 + A_7 - A_5 - A_8) = \frac{1}{2}R^2\left[((W_{xx} - W_{yy})_x - 2(W_{xy})_y)\cos 3\Omega t + ((W_{xx} - W_{yy})_y + 2(W_{xy})_x)\sin 3\Omega t\right]$$

Additionally and simultaneously, the fourth-order gravity tensor components are extracted at four times the disk spin rate by summing accelerometer outputs per $$(A_1 + A_2 + A_3 + A_4) - (A_5 + A_6 + A_7 + A_8) =$$
$$\frac{1}{3}R^3\left[((W_{xx} - W_{yy})_{yy} - (W_{xx} - W_{yy})_{xx})\sin 4\Omega t + 2(W_{xx} - W_{yy})_{xy}\cos 4\Omega t\right]$$

Figure 3:
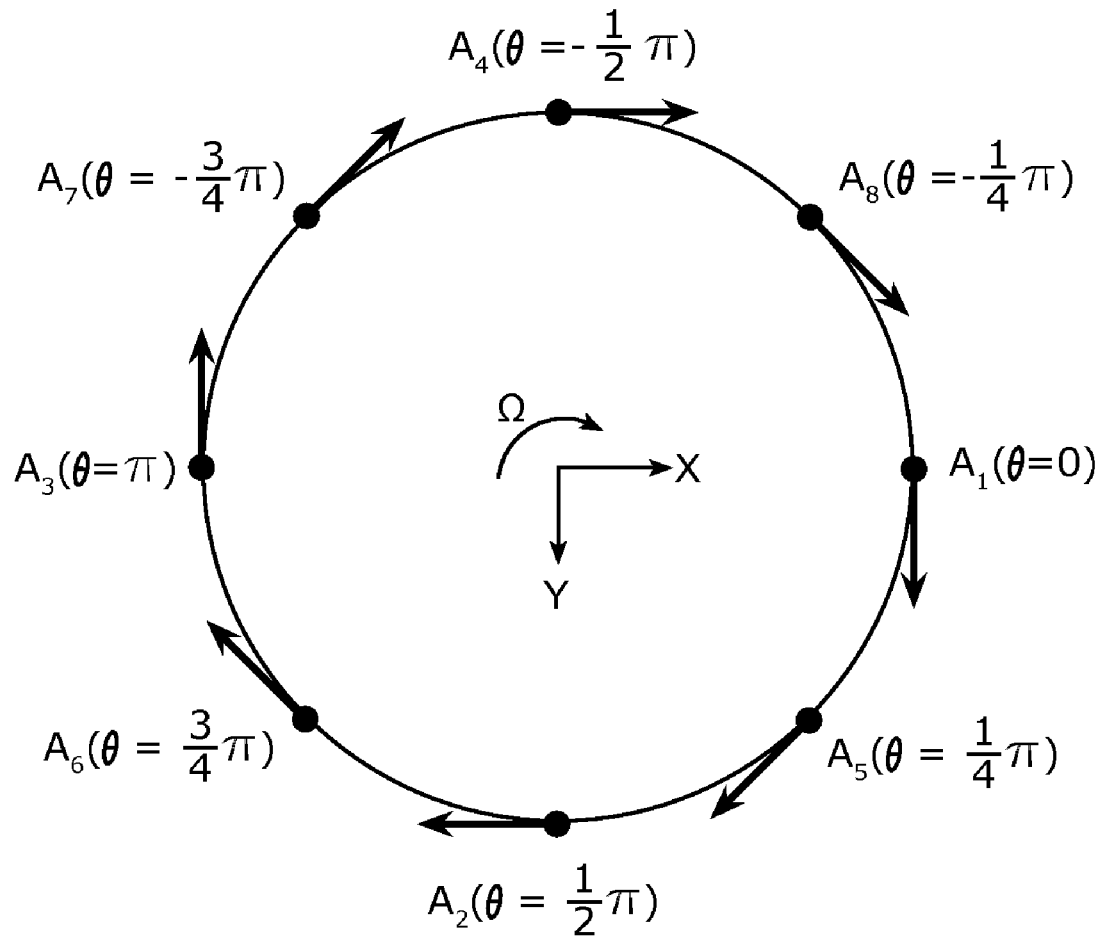
FIG. 3 is a vector diagram of an eight accelerometer arrangement with the equations associated with each accelerometer indicative of the respective output thereof.

In a manner similar to FIG. 2, FIG. 3 is an idealized acceleration vector diagram for an eight accelerometer $A_1$, $A_2$, $A_3$, $A_4$, $A_5$, $A_6$, $A_7$, and $A_8$ arrangement in which the sensitive axis of each accelerometer is shown as an arrow that is aligned tangentially to a common radius R circle with the accelerometers $A_n$ orbiting about the axis $A_z$ at some steady spin rate $\Omega$. Since the various accelerometers are angularly offset from one another by 45 degrees, the respective harmonic outputs will likewise be displaced 45 degrees in phase, e.g., the output of the accelerometer $A_1$ will lead that of accelerometer $A_8$ by 45 degrees while trailing that of accelerometer $A_5$ by 45 degrees.

Figure 3A:
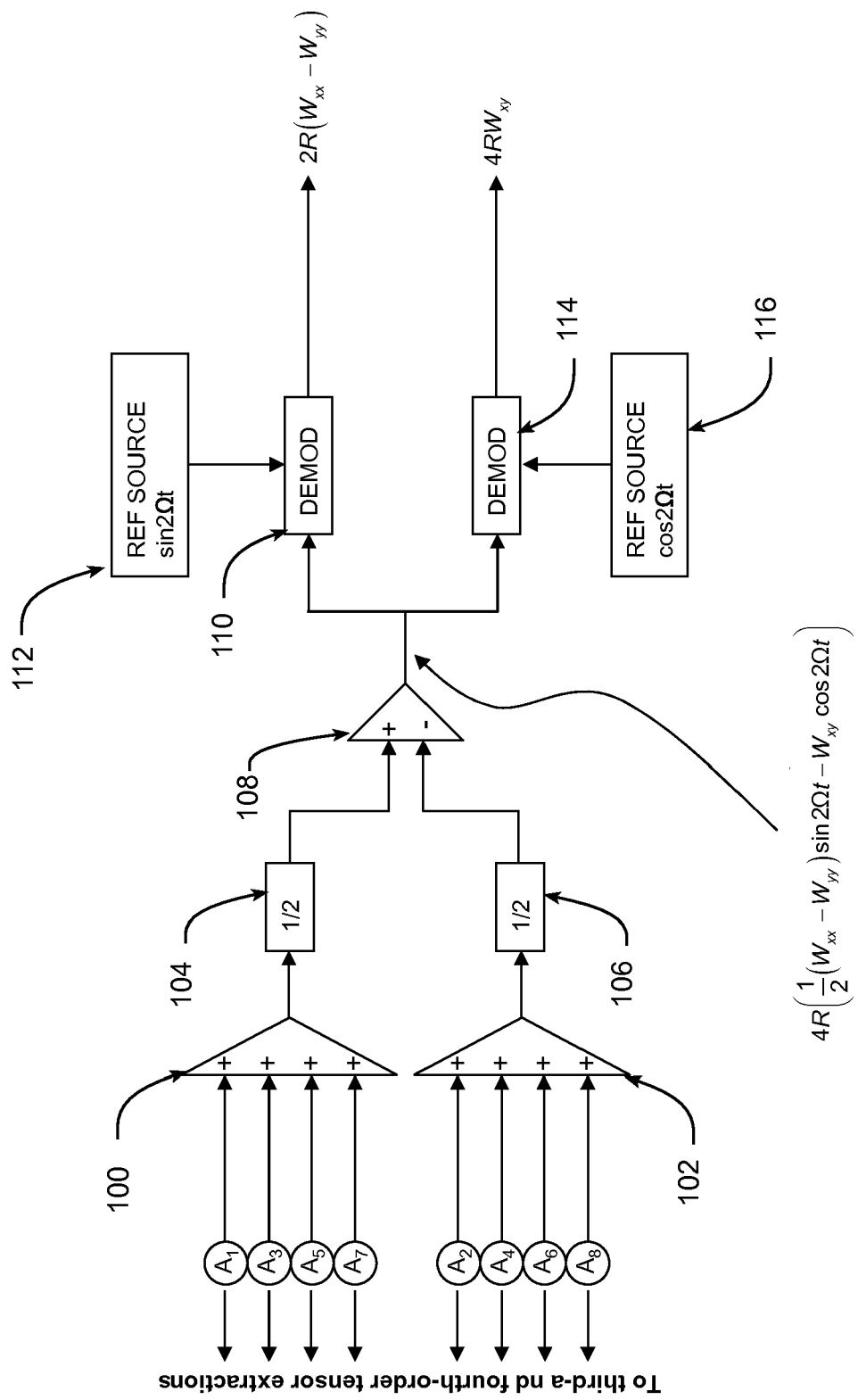
FIG. 3A is a functional block diagram showing the functional processing for isolating and extracting second-order gravity tensor components at 2Ω with an eight accelerometer gradiometer instrument.
Figure 3B:
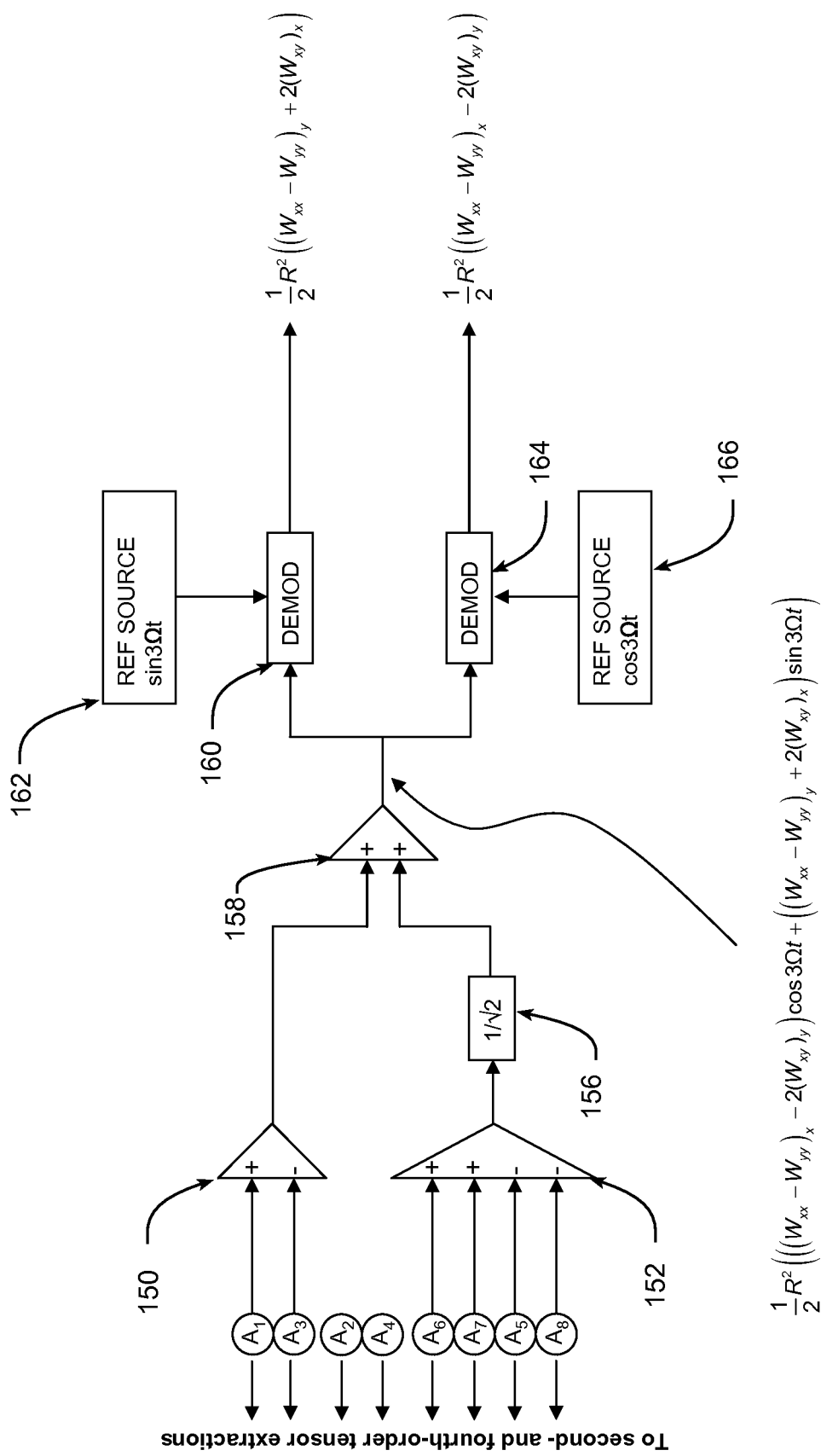
FIG. 3B is a functional block diagram showing the functional processing for isolating and extracting third-order gravity tensor components at 3Ω with an eight accelerometer gradiometer instrument.
Figure 3C:
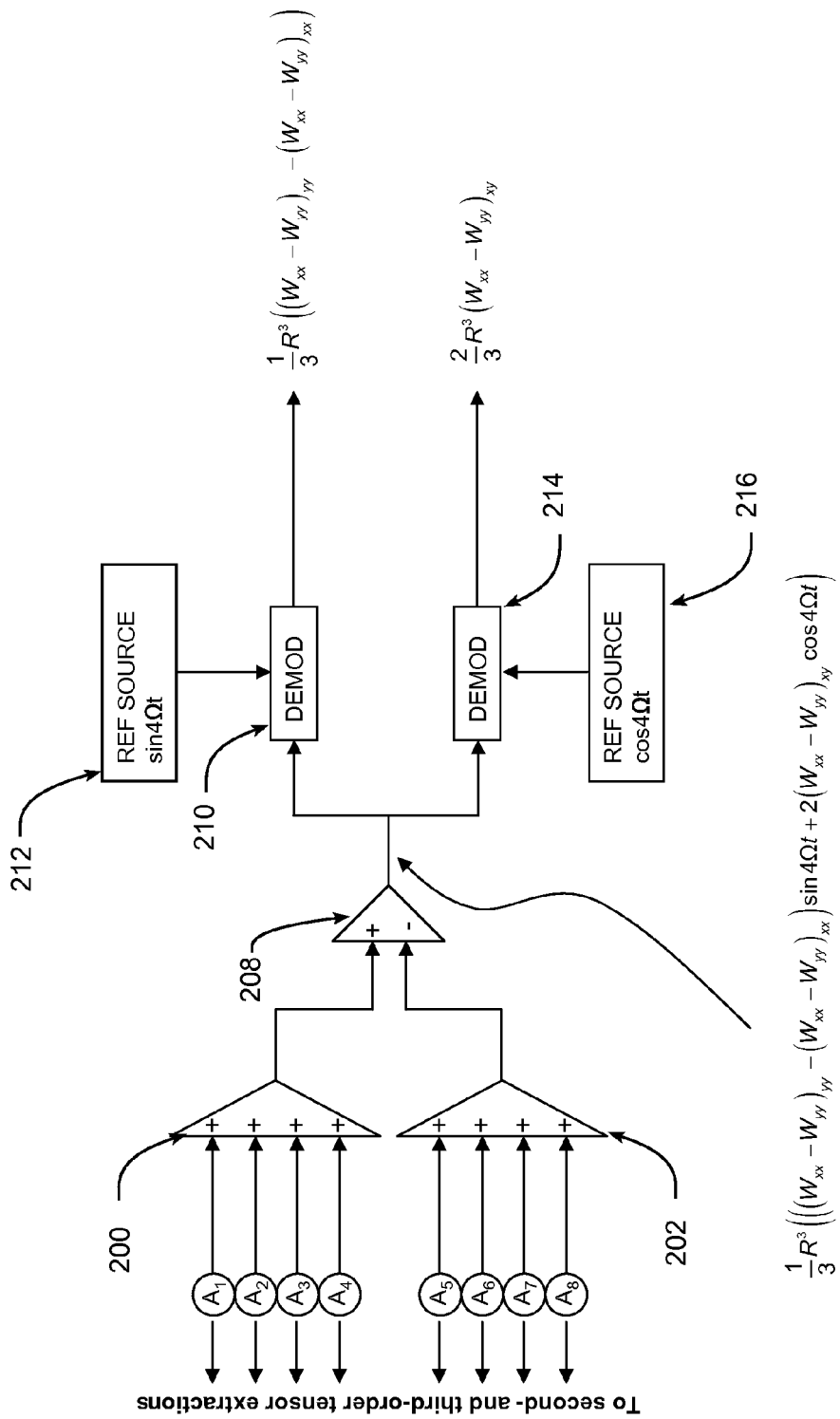
FIG. 3C is a functional block diagram showing the functional processing for isolating and extracting fourth-order gravity tensor components at 4Ω with an eight accelerometer gradiometer instrument.

FIGS. 3A, 3B, and 3C illustrate, respectively, an exemplary functional block diagram illustrating data channel processing for simultaneously isolating and obtaining gravity second-, third-, and fourth-order tensor components in the sensing plane of an eight-accelerometer gradiometer instrument.

In FIG. 3A, the signals from accelerometers $A_1$, $A_3$, $A_5$, and $A_7$ are provided to a summation block 100 and, concurrently, the signals from accelerometers $A_2$, $A_4$, $A_6$, and $A_8$ are provided to a summation block 102 with the respective outputs thereof each divided by two at functional blocks 104 and 106. The so-divided outputs of summation blocks 100 and 102 are differenced at 108 with the output thereof provided to a first demodulator 110 that receives its reference signal sin 2 $\Omega$t from reference signal source 112 and a second demodulator 114 that receives its reference signal cos 2 $\Omega$t from another reference signal source 116 to provide the second-order gravity tensor components outputs shown.

In FIG. 3B, the signals from accelerometers $A_1$ and $A_3$ are differenced in functional block 150 while the signals from accelerometers $A_6$ and $A_7$ are provided to a functional block 152 for summation while the signals from accelerometers $A_5$ and $A_8$ are decremented therefrom in functional block 152 with the output thereof divided by $1/\sqrt{2}$ in functional block 156. The outputs from functional blocks 150 and 156 and summed at functional block 158 and the output thereof provided to a first demodulator 160 that receives its reference signal sin 3 $\Omega$t from reference signal source 162 and a second demodulator 164 that receives its reference signal cos 3 $\Omega$t from another reference signal source 166 to provide the third-order gravity tensor component outputs shown.

In FIG. 3C, the signals from accelerometers $A_1$, $A_2$, $A_3$, and $A_4$ are summed in summation block 200 and the signals from accelerometers $A_5$, $A_6$, $A_7$, and $A_8$ are provided to a summation block 202 for summation. The outputs from functional blocks 200 and 202 are differenced at functional block 208 and the output thereof provided to a first demodulator 210 that receives its reference signal sin 4 $\Omega$t from reference signal source 212 and to a second demodulator 214 that receives its reference signal cos 4 $\Omega$t from another reference signal source 216 to provide the fourth-order gravity tensor component outputs shown.

Figure 4:
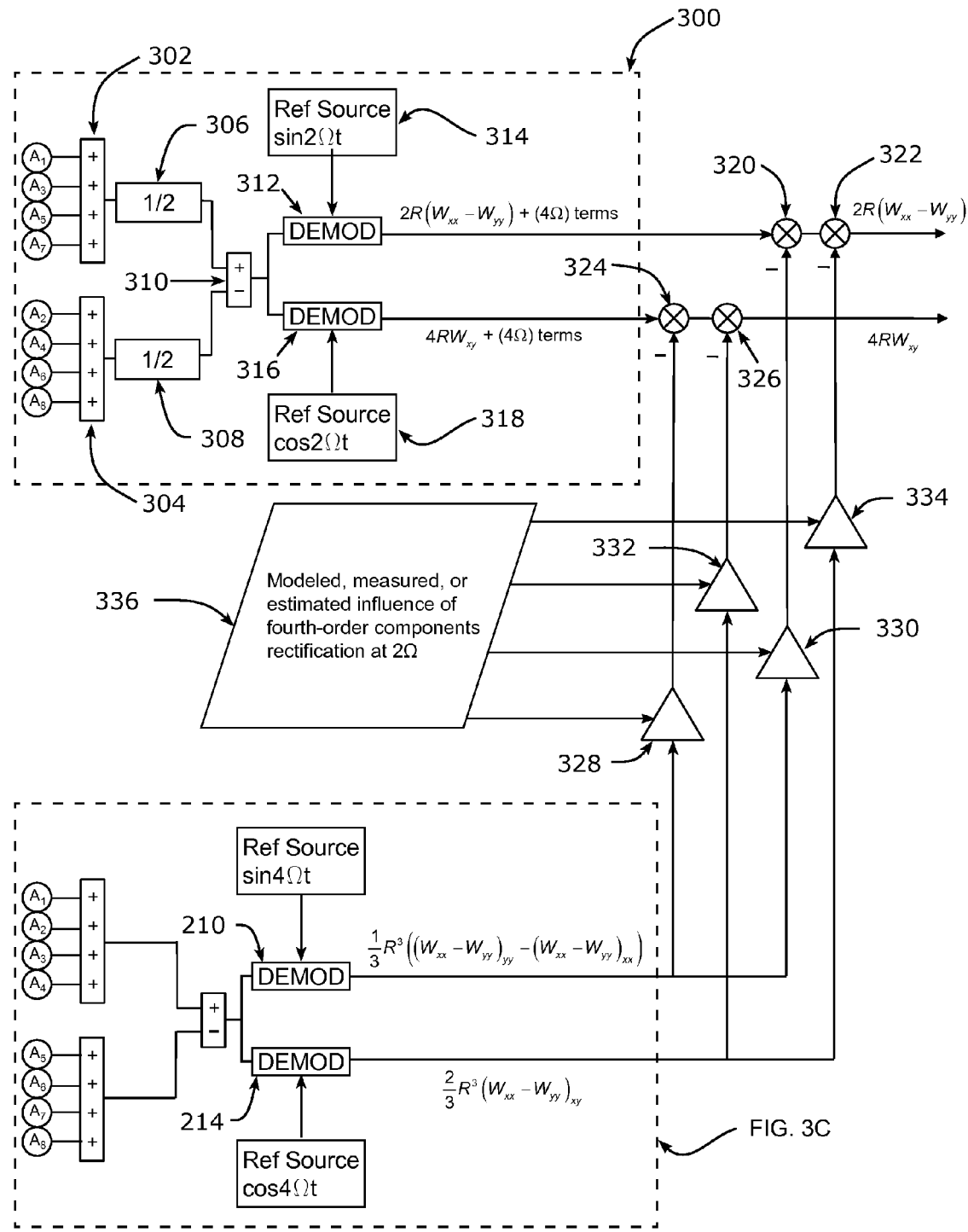
FIG. 4 is a functional block diagram of a representative arrangement for compensating a GGI instrument output for fourth-order tensor components in order to de-noise the GGI instrument output.

FIG. 4 illustrates one manner by which the 4$\Omega$ higher-order harmonics may be removed from the desired lower-order signals in a GGI instrument. In FIG. 4, the processing path of a conventional GGI instrument (for example, of the type disclosed in the aforementioned incorporated patent) is represented at 300. As shown, the outputs of accelerometers $A_1$, $A_3$, $A_5$, and $A_7$ are summed in summation block 302 and the signals from accelerometers $A_2$, $A_4$, $A_6$, and $A_8$ are summed in summation block 304. The outputs of summations blocks 302 and 304 are divided by some value (i.e., ½) and then the difference taken at 310 with the output provided to a first demodulator 312 that receives its reference signal sin 2 Ωt from reference signal source 314 and to a second demodulator 316 that receives its reference signal cos 4 Ωt from another reference signal source 318 to provide the lower-order gravity tensor component outputs. In addition to the desired lower-order components, the output signals also include the 4Ω higher-order harmonics; thus, the outputs of demodulators 312 and 316 can be characterized, respectively, as follows:

$$2R(W_{xx}-W_{yy})+(4\Omega) \text{ terms}$$

$$4RW_{xy}+(4\Omega) \text{ terms}$$

The signal path carrying the first of these signals from demodulator 312 includes first and second differential units 320 and 322 (i.e., subtractors) and the signal line carrying the second of these signals from demodulator 316 also includes third and fourth differential units 324 and 326.

The functional block diagram of FIG. 3C described above has been presented in the lower portion of FIG. 4 and provides the fourth-order gravity tensor component outputs, respectively, from demodulators 210 and 214:

$$\frac{1}{3}R^3\left((W_{xx}-W_{yy})_{yy}-(W_{xx}-W_{yy})_{xx}\right)$$

$$\frac{2}{3}R^3(W_{xx}-W_{yy})_{xy}$$

The output of demodulator 210 is provided as inputs to scaling/compensation amplifiers 328 and 330, which, in turn, provide their respective outputs to differential units 324 and 320. In a similar manner, the output of demodulator 214 is provided as inputs to scaling/compensation amplifiers 332 and 334, which, in turn, provide their respective outputs to differential units 326 and 322. The amplifiers 328/330 and 332/334 thus function to 'condition' the outputs of the demodulators 210 and 214 for mixing with the outputs of the demodulators 312 and 316. Additionally, a compensation functional block 336 provide control signals to each of the scaling/compensation amplifiers to adjust gain or gain response based upon a system model, measured values, and/or a measured value history, or the estimated influence of the fourth-order components within the lower-order signals from the demodulators 312 and 316.

The outputs of the various amplifiers 338, 332, 330, and 334 are provided to their respective differential units 324, 326, 320, and 322 to effectively remove the undesired fourth-order components. Nominally, the fourth-order tensor components are rectified at 4-times the rotor spin rate, i.e., at 4Ω. In practice, however, and as a consequence to various tiny residual misalignments and dynamic perturbations, the fourth-order tensor components are also rectified at twice the rotor spin rate (2Ω). Fortunately, their influence at 2Ω is scaled by tiny misalignments and residual dynamic perturbations so the net effect is usually a low-level noise or cluttering of the sought second-order component data. Having directly measured fourth-order components as described herein, the second-order data output stream can be de-noised or de-cluttered by scaling the fourth-order effects by otherwise measured, estimated, or calibrated misalignments and such, then subtracted from the data stream subsequently, resulting in purer 20 output data.

As can be appreciated, the arrangement of FIG. 4 processes a signal or signals from the GGI 300 containing a sought-after lower-order signal that also includes a higher-order component or harmonic therein and generates another signal or signals representative of that higher-order component or harmonic and controllably uses that higher-order component or harmonic signal to attenuate or remove the higher-order component or harmonic from the output of the GGI to effectively "de-clutter" or de-noise" the output of the GGI.

The functional block diagrams of FIGS. 2A-2B, 3A-3C, and 4 and the equations therein can be implemented in analog or digital form (or a combination thereof) and can take the form of discrete devices or, more preferably, as one or more firmware- or software-controlled microprocessors or microcomputers (as well as special-purpose processors, including RISC processors), application specific integrated circuits (ASIC), programmable logic arrays (PLA), discrete logic or analog circuits, and/or combinations thereof. If desired, multi-processor parallel processing can be utilized.

The present invention can be implemented in a preferred embodiment by modifying existing gravity gradiometer design to incorporate a second rotating disc structure (in a manner consistent with FIG. 1) carrying the accelerometers $A_1$-$A_6$ (or $A_1$-$A_8$) described above or by the addition of the accelerometers described above on the existing disc that carries the accelerometer pairs for the conventional gradient measurements.

As can be appreciated, the above described six and eight accelerometer embodiments can extended to ten accelerometer embodiment; in general, n-accelerometer variants can be configured such that each of the n accelerometers is spaced 360/n degrees from its neighbor around the circumference of a disk or instrument block.

As will be apparent to those skilled in the art, various changes and modifications may be made to the illustrated embodiment of the present invention without departing from the spirit and scope of the invention as determined in the appended claims and their legal equivalent.

The invention claimed is:
1. A gravity gradiometer instrument having a gyro-stabilized platform for maintaining a selected orientation with regard to a local gravity field and of a type that outputs a lower-order gravity-gradient signal having respective first and second higher-order gravity-related signal components associated therewith and having further instrumentation associated therewith for determining said respective higher-order gravity-related signal components, comprising:
 a gyro-stabilized platform for maintaining said selected orientation with regard to the local gravity field;
 a rotatably mounted accelerometer arrangement including six accelerometers arranged at an equal spacing from a spin axis and at an equi-angular spacing about the spin axis, a sensing axis of each accelerometer aligned substantially tangentially to a circle subscribed by the accelerometers as they rotate about the spin axis;
 means for isolating and extracting said respective higher-order gravity-related signal components in accordance with

$$(A_1+A_5)-\frac{1}{2}(A_2+A_3+A_4+A_6)=$$

-continued
$$3R\left(\frac{1}{2}(W_{xx} - W_{yy})\sin2\Omega t - W_{xy}\cos2\Omega t\right),$$

wherein
$A_1, A_2, A_3, A_4, A_5, A_6$: six accelerometers,
R: radius of the circle,
$W_{xx}, W_{yy}, W_{xy}$: second-order tensor components,
$\Omega$: spin rate of the accelerometers,
and;
means for combining said respective higher-order gravity related signal components with corresponding first and second lower-order gravity related signal components to substantially attenuate the respective higher-order gravity related signal components in said first and second lower-order gravity-related signal components.

2. A gravity gradiometer instrument having a gyro-stabilized platform for maintaining a selected orientation with regard to a local gravity field and of a type that outputs a lower-order gravity-gradient signal component having respective first and second third-order gravity-related signal components associated therewith and having further instrumentation associated therewith for determining said respective third-order gravity-related signal components, comprising:
 a rotatably mounted accelerometer arrangement including six accelerometers arranged at an equal spacing from a spin axis and at an equi-angular spacing about the spin axis, a sensing axis of each accelerometer aligned substantially tangentially to a circle subscribed by the accelerometers as they rotate about the spin axis;
 means for determining said respective third-order gravity-related signal components in accordance with $$(A_1 + A_2 + A_3) - (A_4 + A_5 + A_6) =$$
$$\frac{3}{4}R^2\left[\left((W_{xx} - W_{yy})_x - 2(W_{xy})_y\right)\cos3\Omega t + \left((W_{xx} - W_{yy})_y + 2(W_{xy})_x\right)\sin3\Omega t\right]$$

wherein
$A_1, A_2, A_3, A_4, A_5, A_6$: six accelerometers,
R: radius of the circle,
$W_{xx}, W_{yy}, W_{xy}$: second-order tensor components,
$(W_{xx}-W_{yy})_x, (W_{xy})_y, (W_{xx}-W_{yy})_y, (W_{xy})_x$: third-order tensor components,
$\Omega$: spin rate of the accelerometers, and;
means for combining said respective third-order gravity related signal components with corresponding lower-order gravity related signal components to substantially attenuate the respective third-order gravity related signal components in said lower-order gravity related signal components.

3. A gravity gradiometer instrument having a gyro-stabilized platform for maintaining a selected orientation with regard to a local gravity field and of a type that outputs a first and a second lower-order gravity-gradient signal component each having respective first and second second-order gravity-related signal components associated therewith and having further instrumentation associated therewith for determining said respective second-order gravity-related signal components, comprising:
 a rotatably mounted accelerometer arrangement including eight accelerometers arranged at an equal spacing from a spin axis and at an equi-angular spacing about the spin axis, a sensing axis of each accelerometer aligned substantially tangentially to a circle subscribed by the accelerometers as they rotate about the spin axis;
 means for isolating and extracting a second order component of the gravity tensor in accordance with $$\frac{1}{2}(A_1 + A_3 + A_5 + A_7) - \frac{1}{2}(A_2 + A_4 + A_6 + A_8) =$$
$$4R\left[\frac{1}{2}(W_{xx} - W_{yy})\sin2\Omega t - W_{xy}\cos2\Omega t\right]$$

wherein
$A_1, A_2, A_3, A_4, A_5, A_6, A_7, A_8$: eight accelerometers,
R: radius of the circle,
$W_{xx}, W_{yy}, W_{xy}$: second-order tensor components,
$\Omega$: spin rate of the accelerometers, and;
means for combining said respective second-order gravity related signal components with corresponding first and second lower-order gravity related signal components to substantially attenuate the first and second second-order gravity related signal components in said first and second lower-order gravity related signal components.

4. A gravity gradiometer instrument having a gyro-stabilized platform for maintaining a selected orientation with regard to a local gravity field and of a type that outputs a first and a second lower-order gravity-gradient signal component each having respective first and second third-order gravity-related signal components associated therewith and having further instrumentation associated therewith for determining said respective third-order gravity-related signal components, comprising:
 a rotatably mounted accelerometer arrangement including eight accelerometers arranged at an equal spacing from a spin axis and at an equi-angular spacing about the spin axis, a sensing axis of each accelerometer aligned substantially tangentially to a circle subscribed by the accelerometers as they rotate about the spin axis;
 means for isolating and extracting a third order component of the gravity tensor in accordance with $$(A_1 - A_3) + \frac{1}{\sqrt{2}}(A_6 + A_7 - A_5 - A_8) =$$
$$\frac{1}{2}R^2\left[\left((W_{xx} - W_{yy})_x - 2(W_{xy})_y\right)\cos3\Omega t + \left((W_{xx} - W_{yy})_y + 2(W_{xy})_x\right)\sin3\Omega t\right]$$

wherein
$A_1, A_2, A_3, A_4, A_5, A_6, A_7, A_8$: eight accelerometers,
R: radius of the circle,
$W_{xx}, W_{yy}, W_{xy}$: second-order tensor components,
$(W_{xx}-W_{yy})_x, (W_{xy})_y, (W_{xx}-W_{yy})_y, (W_{xy})_x$: third-order tensor components,
$\Omega$: spin rate of the accelerometers, and;
means for combining said respective third higher-order gravity related signal components with corresponding first and second lower-order gravity related signal components to substantially attenuate the respective third higher-order gravity related signal components in said first and second lower-order gravity related signal components.

5. A gravity gradiometer instrument having a gyro-stabilized platform for maintaining a selected orientation with regard to a local gravity field and of a type that outputs a first and a second lower-order gravity-gradient signal component each having respective first and second fourth-order gravity-related signal components associated therewith and having further instrumentation associated therewith for determining said respective third-order gravity-related signal components, comprising:

a rotatably mounted accelerometer arrangement including eight accelerometers arranged at an equal spacing from a spin axis and at an equi-angular spacing about the spin axis, a sensing axis of each accelerometer aligned substantially tangentially to a circle subscribed by the accelerometers as they rotate about the spin axis;

means for isolating and extracting a fourth-order component of the gravity tensor in accordance with $$(A_1 + A_2 + A_3 + A_4) - (A_5 + A_6 + A_7 + A_8) =$$
$$\frac{1}{3}R^3\left[((W_{xx} - W_{yy})_{yy} - (W_{xx} - W_{yy})_{xx})\sin 4\Omega t + 2(W_{xx} - W_{yy})_{xy}\cos 4\Omega t\right]$$

wherein
$A_1, A_2, A_3, A_4, A_5, A_6, A_7, A_8$: eight accelerometers,
R: radius of the circle,
$W_{xx}, W_{yy}, W_{xy}$: second-order tensor components,
$(W_{xx}-W_{yy})W_{yy}, (W_{xx}-W_{yy})_{xx}, (W_{xx}-W_{yy})W_{xy}$: fourth-order tensor components,
$\Omega$: spin rate of the accelerometers, and;

means for combining said respective fourth higher-order gravity related signal components with corresponding first and second lower-order gravity related signal components to substantially attenuate said respective fourth higher-order gravity related signal components in said first and second lower-order gravity related signal components.

6. In a gravity gradiometer instrument of a type having six accelerometers arranged at an equal spacing from a spin axis and at an equi-angular spacing about the spin axis and organized as three accelerometer pairs, a sensing axis of each accelerometer aligned substantially tangentially to a circle subscribed by the accelerometers as the accelerometers rotate about the spin axis orbiting the spin axis and of a type that outputs a first and a second lower-order gravity-gradient signal component each having a higher-order gravity-related signal component therein, a method of attenuating the higher-order gravity-related signal component, comprising the steps of:

generating a signal representative of the higher-order gravity-related signal component as a function of outputs of said accelerometer pairs orbiting the spin axis;
demodulating said signal using a sin $\Psi\Omega t$ reference source and demodulating said signal using a cos $\Psi\Omega t$ reference source to obtain first and second higher-order gravity related signal components where $\Psi$ is a multiple of a corresponding lower-order signal component;
conditioning said first and second higher-order gravity related signal components; and
combining said first and second higher-order gravity related signal components with corresponding first and second lower-order gravity related signal components to substantially attenuate the first and second higher-order gravity related signal components in said first and second lower-order gravity related signal components.

7. In a gravity gradiometer instrument of a type having eight accelerometers arranged at an equal spacing from a spin axis and at an equi-angular spacing about the spin axis and organized as four accelerometer pairs, a sensing axis of each accelerometer aligned substantially tangentially to a circle subscribed by the accelerometers as the accelerometers rotate about the spin axis and of a type that outputs a first and a second lower-order gravity-gradient signal component each having a higher-order gravity-related signal component therein, a method of attenuating the higher-order gravity-related signal component, comprising the steps of:

generating a signal representative of the higher-order gravity-related signal component as a function of outputs of said accelerometer pairs orbiting the spin axis;
demodulating said signal using a sin $\Psi\Omega t$ reference source and demodulating said signal using a cos $\Psi\Omega t$ reference source to obtain first and second higher-order gravity related signal components where $\Psi$ is a multiple of a corresponding lower-order signal component;
conditioning said first and second higher-order gravity related signal components; and
combining said first and second higher-order gravity related signal components with corresponding first and second lower-order gravity related signal components to substantially attenuate the first and second higher-order gravity related signal components in said first and second lower-order gravity related signal components.

* * * * *